United States Patent
Schulzki et al.

(10) Patent No.: US 11,307,078 B2
(45) Date of Patent: Apr. 19, 2022

(54) SCALE WITH OVERLOAD DETECTION MEASURED BY AUXILIARY VOLTAGE

(71) Applicant: Wipotec GmbH, Kaiserslautern (DE)

(72) Inventors: Alexander Schulzki, Stelzenberg (DE); Jan Gottfriedsen, Waldfischbach-Burgalben (DE)

(73) Assignee: Wipotec GmbH, Kaiserslautern (DE)

( * ) Notice: Subject to any disclaimer, the term of this patent is extended or adjusted under 35 U.S.C. 154(b) by 98 days.

(21) Appl. No.: 16/713,415

(22) Filed: Dec. 13, 2019

(65) Prior Publication Data

US 2020/0217709 A1 Jul. 9, 2020

(30) Foreign Application Priority Data

Dec. 21, 2018 (DE) .................. 102018133563.6

(51) Int. Cl.
*G01G 7/02* (2006.01)

(52) U.S. Cl.
CPC ...................... *G01G 7/02* (2013.01)

(58) Field of Classification Search
CPC .............................. G01G 7/02; G01G 23/005
See application file for complete search history.

(56) References Cited

U.S. PATENT DOCUMENTS

| 3,789,937 | A | | 2/1974 | Strobel et al. |
| 4,149,605 | A | | 4/1979 | Mettler et al. |
| 4,273,203 | A | * | 6/1981 | Blawert .............. G01G 1/246 |
| | | | | 177/187 |
| 4,730,683 | A | | 3/1988 | Reichmuth |
| 4,930,588 | A | | 6/1990 | Kuhlmann et al. |
| 5,096,007 | A | * | 3/1992 | Burkhard ............ G01G 23/005 |
| | | | | 177/187 |
| 5,184,690 | A | | 2/1993 | Komoto |
| 5,419,204 | A | | 5/1995 | Yamaguchi et al. |
| 5,721,398 | A | * | 2/1998 | Balsen ................ G01G 23/005 |
| | | | | 177/184 |
| 5,847,328 | A | * | 12/1998 | Oldendorf ............ G01G 19/24 |
| | | | | 177/25.11 |
| 9,417,118 | B2 | * | 8/2016 | Gottfriedsen ......... G01G 23/10 |
| 9,702,752 | B2 | * | 7/2017 | Feldotte .................. G01G 7/04 |

(Continued)

FOREIGN PATENT DOCUMENTS

| CN | 107340040 A | 11/2017 |
| DE | 19619410 A1 | 1/1997 |
| DE | 19828515 A1 | 12/1999 |

(Continued)

OTHER PUBLICATIONS

Machine translation of DE 198 28 515 (Year: 1998).*

(Continued)

*Primary Examiner* — Natalie Huls
(74) *Attorney, Agent, or Firm* — The Culbertson Group, P.C.

(57) ABSTRACT

A device and method for detection of an overload on a scale which operates by the principle of electromagnetic force compensation The device and method employing, in addition to the measurement voltage arising across a measurement resistor of the scale, an auxiliary voltage that is different from the measurement voltage. The auxiliary voltage being tapped at the input to the compensation coil of the scale or at the output of the compensation coil.

18 Claims, 2 Drawing Sheets

(56) References Cited

U.S. PATENT DOCUMENTS

2008/0053249 A1    3/2008  Reber et al.
2015/0027792 A1    1/2015  Feldotte et al.

FOREIGN PATENT DOCUMENTS

| DE | 102006059261 A | 7/2008 |
|---|---|---|
| JP | 61107115 A | 5/1986 |
| JP | 798241 A | 4/1995 |
| JP | 2005017161 A | 1/2005 |
| JP | 2012173247 A | 9/2012 |

OTHER PUBLICATIONS

Machine translation of DE 196 19 410 (Year: 1998).*
Machine translation of DE 10 2006 059 261 (Year: 2008).*
DE 10 2018 133 563.6. German Patent Office Office Action dated Oct. 29, 2019.
JPO Action dated Jan. 5, 2021 in Japanese patent application No. 2019231177.
EPO extended European search report dated May 26, 2020 in European patent application No. 19218826.6.

* cited by examiner

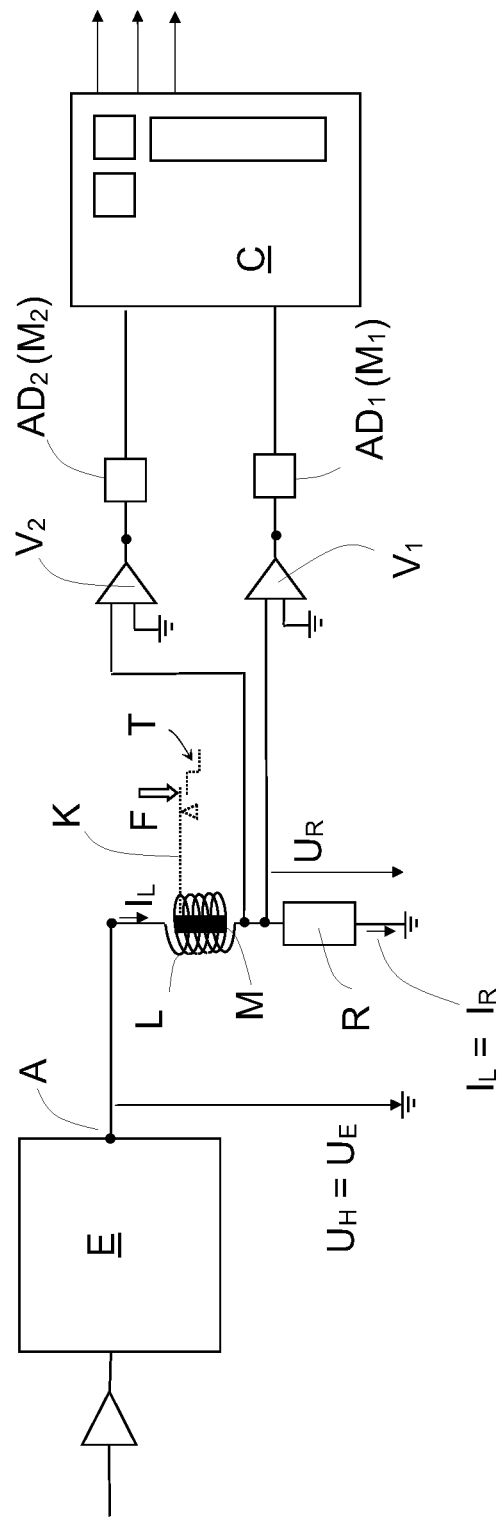

SCALE WITH OVERLOAD DETECTION MEASURED BY AUXILIARY VOLTAGE

TECHNICAL FIELD OF THE INVENTION

The present invention concerns a scale that operates by the principle of electromagnetic force compensation and which includes an arrangement for detecting or diagnosing "overload" conditions in the operation of the scale.

BACKGROUND OF THE INVENTION

Scales which operate by the principle of electromagnetic force compensation utilize a compensation coil which is located in the magnetic field of a preferably fixed magnet and in a predetermined set position relative to the magnet. The compensation coil may be disposed on a lever of a lever system which receives the weight force to be measured or may be otherwise disposed in "direct acting" scales which do not include a lever system. In order to hold the lever or the coil always in the set position even for different forces, an appropriately controlled counterforce is generated with the coil by producing a coil current that flows through the coil and generates a Lorentz force acting in the magnetic field of the magnet. The current is provided by an electronic unit that is referred to herein as the "output stage", where said unit can be designed for unipolar or bipolar power supply to the coil. The magnitude of the regulated coil current is a measure of how strong the counterforce generated by the coil is, which in turn is a measure of the weight force or load introduced to the lever system (or other weight force receiving element in scales without a lever system).

To evaluate the coil current, a measurement resistor is connected in series with the coil and the voltage across the measurement resistor, optionally preprocessed by amplification and/or filters (V) or other electronic components, is sent to an A/D (analog-to-digital) converter. This A/D converter converts the incoming voltage to digital signals, which are sent to a control unit for evaluation, in order, for example, to display the weight value or to actuate weight-dependent control operations.

An A/D converter that is used in this way may operate within a presettable measurement range. If the introduced load or the voltage across the measurement resistor lies outside (below or above) this measurement range, an overload condition exists. In the prior art, the overload case can only be detected by the fact that the voltage detected by the A/D converter lies outside the measurement range that is intended for the measurement and nothing specific can be determined about the magnitude and other characteristics of the overload. However, the duration, magnitude, number, kind, and time of the overload affect the operation and precision of the scale, since, after an overload case, the scale may need a certain recovery time, or setting a zero point or readjustment will even be necessary.

SUMMARY OF THE INVENTION

The aim of the invention therefore is to present a scale with overload detection, or overload diagnosis, that enables an evaluation of overload cases and control of the scale that is dependent thereon, and enables a testing of the functional capability of the overload safety system and evaluation of the actuating threshold.

Methods and apparatus according to the present invention facilitate overload detection and evaluation utilizing an auxiliary measurement voltage $U_H$, which is registered in addition to the voltage $U_R$ across the measurement resistor R. According to the invention, the auxiliary measurement voltage is the voltage that is present either
    (a) between the output of the output stage and the coil, or
    (b) between the coil and the measurement resistor.

In variant (a), the auxiliary measurement voltage can preferably be tapped directly at the output of the output stage. Alternatively, a protective resistor could additionally be provided between the output of the output stage and the coil, for instance for purposes of explosion protection. It is then also possible to tap the auxiliary measurement voltage between the protective resistor and the coil. Variant (b) could be a little simpler in its construction or circuitry, where in this case the auxiliary measurement voltage could be close to the measurement resistor voltage.

In the case of an overload, the auxiliary measurement voltage ($U_H$) lies outside the range or the voltage ($U_R$) of the measurement resistor that can be correctly registered for the measurement range of the associated A/D converter to which the measurement resistor voltage ($U_R$) is coupled either directly or through one or more amplifiers and/or filters. However, through the separate evaluation of the auxiliary measurement voltage according to the invention, the overload can be registered quantitatively and/or qualitatively. Preferably, the measurement range for registration of the auxiliary measurement voltage essentially corresponds to the maximum output voltage of the output stage.

The auxiliary measurement voltage is also coupled to an A/D converter either directly or through one or more amplifiers and/or filters. By switching the input voltage, this can be the same A/D converter ($AD_1$) with which the measurement resistor voltage ($U_R$) is also registered. Then, to be able to register a higher (or lower) voltage, a different, suitable measurement range can be set on the A/D converter (two "overlapping" measurement ranges for the measurement resistor voltage ($U_R$) and the auxiliary measurement voltage ($U_H$) are also considered in this case to be "different" measurement ranges). Alternatively, the auxiliary measurement voltage, which is amplified like the measurement resistor voltage before being sent to the A/D converter, preferably with an amplifier V, can undergo a lower amplification than the measurement resistor voltage, so that the A/D converter can be operated without modification, and the auxiliary measurement voltage is sent "reduced" and therefore can be evaluated.

In one embodiment according to the invention, the auxiliary measurement voltage therefore is coupled to the same A/D converter that registers the voltage ($U_R$) of the measurement resistor in regulator operation. For this, the input of the A/D converter is switched from the measurement resistor voltage ($U_R$) to the auxiliary measurement voltage ($U_R$) as soon as the measurement resistor voltage ($U_R$) lies outside the preset measurement range or comes close to the upper limit, and thus exceeds a preset threshold. The switching can be initiated and/or undertaken by the A/D converter itself. The switching means can be designed to be external to the A/D converter or can be an integral component of it. In the latter case (integrated), the A/D converter has two input terminals. In the former case (external), the A/D converter can have a control output for control of the switching means.

When the signal source present at the input of the A/D converter is switched, either the measurement range of the converter also becomes switched (for example, the sensitivity of the converter can be halved and thus the measurement range doubled), or the amplification of the auxiliary measurement voltage can be appropriately reduced, without having to change the measurement range of the A/D converter.

In an alternative embodiment of a scale in accordance with the present invention, the measurement resistor voltage ($U_R$) is coupled to a first A/D converter $AD_1$, while a second A/D converter $AD_2$, which is made separate from the first A/D converter $AD_1$, is provided for coupling to the auxiliary measurement voltage ($U_H$). In this case, the measurement range of the second A/D converter can be selected to be sufficiently large to be able to register the input auxiliary measurement voltage and evaluate it right from the start. Alternatively, the amplification of the auxiliary measurement voltage ($U_H$) can be selected such that the two A/D converters can be operated with the same measurement range.

In electromagnetic force compensation, the "compensation load" is defined by the maximum compensation current that the output stage can provide in order to keep the coil in the set position. For a load that goes beyond this, the output stage can no longer provide a sufficient coil current, so that the coil and a lever mechanism that may be carrying it are deflected and leave the set position.

To avoid overload of a scale, there are known mechanical overload safety means that are intended to protect the lever mechanism and mechanically prevent (possibly irreversible) deformations of the lever mechanism or other scale components. In scale technology, an overload is then already assumed by definition to have occurred when the measurement resistor voltage ($U_R$) lies outside of the measurement range of the associated A/D converter. A mechanical overload that threatens the scale mechanism does not need to be present. Because of the exceeded measurement range of the A/D converter, the force generated on the coil, however, can no longer be quantitatively determined from the measurement resistor voltage ($U_R$).

Mechanical overload safety means are designed so that they preferably intervene before permanent damage arises (however, in some cases only afterward). In the preferred case, the compensation load or the maximum output voltage of the output stage does not yet cause the coil or its lever arm to leave the set position, since the output stage can provide sufficient compensation current to the coil. In this case, even though the resistor voltage ($U_R$) lies outside of the measurement range provided in the associated A/D converter, the tapped auxiliary measurement voltage ($U_H$) can be quantitatively evaluated in an A/D converter with a greater measurement range or by reduced amplification so as to be able to analyze the overload as follows:

In the normal operation of a scale in accordance with the present invention, the compressive or tensile load introduced into the scale gives rise to a resistor measurement voltage ($U_R$) within the measurement range of the associated A/D converter in the manner indicated above. If the weight force increases further, the resistor measurement voltage will increase correspondingly. If it goes outside the foreseen measurement range of the A/D converter, determination of the coil current is no longer possible. However, with the increase/decrease of the force (load) acting on the scale platform (load introduction), the tapped auxiliary measurement voltage also increases.

It increases, for example in the case of an increasing load force, until the maximum output voltage of the output stage has been reached and/or a mechanical overload safety means intervenes. If the overload safety means intervenes before the maximum output voltage of the output stage has been reached, the coil current will have reached a maximum and the auxiliary measurement voltage will increase no further, but rather will remain essentially constant. Its course and its maximum value then allow conclusions to be drawn about the actuating force and functional capability of the overload safety means.

Information about the overload safety means can be obtained from the course and/or the magnitude of the auxiliary measurement voltage, where the mere exceeding of presettable, thus controllable, limit values can already qualitatively indicate the actuating of the overload safety means. Quantitative evaluation of the auxiliary measurement voltage takes place provided the maximum output voltage of the output stage has not been reached, thus allowing the assignment of a certain load value (for example, force in Newtons, weight in g, kg, etc.) that caused the actuating of the overload safety means.

Preferably, a control unit to evaluate the measurement resistor voltage ($U_R$) and the auxiliary measurement voltage ($U_H$), or their digital values provided by the associated A/D converter(s), is provided for the scale. The control can be designed, among other ways, to detect overload cases, to define or store limit values for overload cases in fixed or variable (tracking) form, to output warning signals, for example visually or acoustically, to interrupt (to block) weighing functions temporarily or permanently, and to establish or to request or actuate zero points or adjustments. It can additionally be designed to process, store, or output the measurement resistor voltage ($U_R$) and/or the auxiliary measurement voltage ($U_H$) or values or signals derived from said parameters, or to register and evaluate the exceeding of presettable limit values by kind, number, magnitude, duration, time point, etc. (for example, in order to estimate a remaining life span of individual components of the scale, such as the overload safety means, or for the scale as a whole) and, depending thereon, to output control or alarm signals to the scale control means, a higher level system control means, or to an operator.

Parameters for operation of the scale, in particular for definition of limit values for determining overload cases, can be transmitted to the control unit or an associated memory unit manually or in digital form via an associated interface.

In order to test the function and the status of the actuating threshold or the limit value of a mechanical overload safety means, forces or test loads (known, optionally traceable, standard weights) can be put on the scale platform (introduction of a load) in a test run in order to assign specific auxiliary measurement voltage values to the actuating of the overload safety means. In contrast, a merely qualitative indication of an overload already results from the fact that the measurement resistor voltage ($U_R$) lies outside the measurement range of its A/D converter.

Methods according to the invention for detection of an overload case on a scale comprises the registration and evaluation of the auxiliary measurement voltage. Through this, it becomes possible according to the invention to analyze the behavior of the scale within the intended load range of the output stage (maximum output voltage, equivalent maximum output current) and above the measurement range specified for the measurement resistor voltage ($U_R$).

Methods according to the present invention may also include the output of an overload signal if the auxiliary measurement voltage exceeds a presettable limit value or exhibits a timewise course that corresponds to an overload case. The latter would, for example, then be the case when the auxiliary measurement voltage initially rises monotonically up to a maximum value, which remains constant within a presettable time period. This would be an indication that a mechanical overload safety means has been actuated, releasing the output stage from the need to make available an additionally increasing coil current.

Expediently, methods according to the present invention may also include the output and/or display and/or storage of the auxiliary measurement voltage or a value corresponding to it (in this application, the terms "value" or "signal" are in this respect to be considered equivalent to the measured or processed voltages, as values or signals derived from the voltages or that can be associated with them. A digital or analog signal can correspond to a specific (numerical) value, which characterizes, for example, a voltage or a load).

The output can take place via suitable display means (display, computer screen, binary signal, etc.), and the reaching of a threshold value could also be indicated, for example, visually or acoustically. The auxiliary measurement voltage or its corresponding values can be transmitted as digital data to a suitable higher-level control means for evaluation. The voltages registered in the scale or corresponding values, for example with a time stamp and additional data (for example, temperature, humidity, air pressure, and various data derived therefrom), can be stored and output on demand in order to establish a history.

After an overload case, it may be necessary to take the scale out of operation temporarily or permanently, or at least to prevent the output of weight values and optionally to activate additional protective measures. Alternatively, it may be necessary to set a new zero point for the scale or to readjust the scale. These requirements can be displayed, requested, and/or automatically initiated or carried out within the scope of methods according to the invention so as to be able to operate the scale optimally while taking into account overload cases.

A scale according to the invention and associated method can be advantageously used for quality assurance in production and/or for self-diagnosis in the field so as to be able to undertake, for example, a comparison with an as-delivered state or with historical data.

These and other advantages and features of the invention will be apparent from the following description of representative embodiments, considered along with the accompanying drawings.

BRIEF DESCRIPTION OF THE DRAWINGS

FIG. 3 shows another embodiment of a scale according to the invention with two separate A/D converters and auxiliary measurement voltage.

DESCRIPTION OF REPRESENTATIVE EMBODIMENTS

Figure 1:
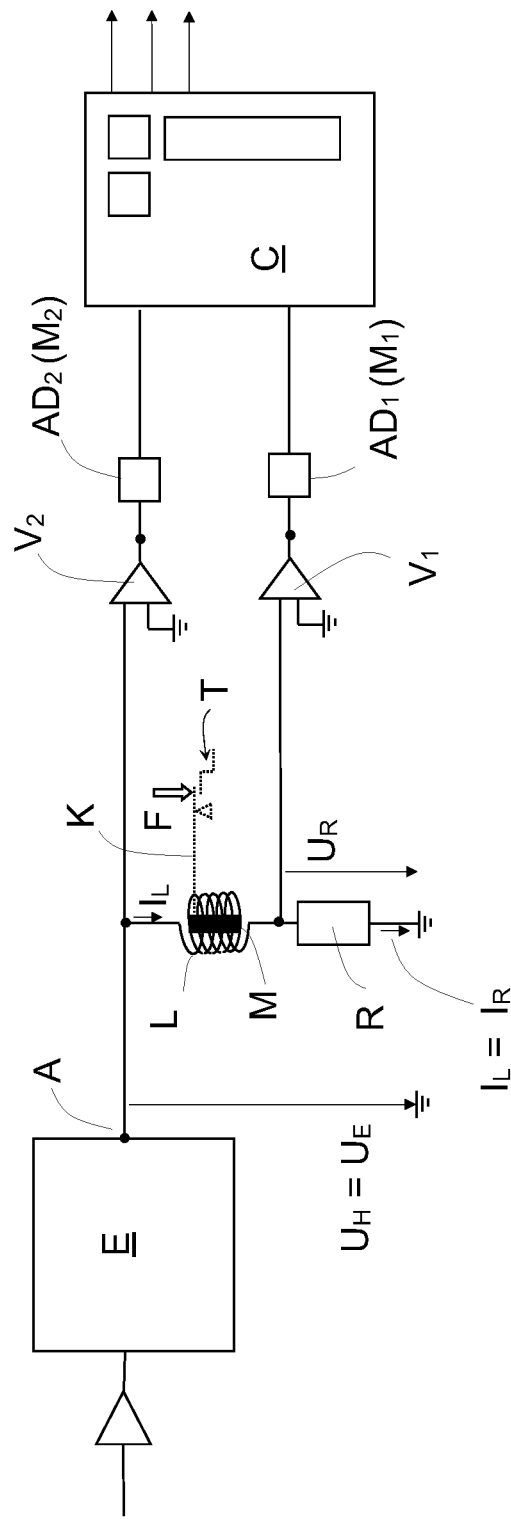
FIG. 1 shows a first embodiment of a scale according to the invention with two separate A/D converters.

FIG. 1 is a schematic representation showing the simplified circuitry of a scale according to the invention in a first embodiment. An output stage E is designed to output a coil current $I_L$, which flows through a compensation coil L and a measurement resistor R connected in series with it. The coil L interacts with a magnet M and is disposed at the end of a lever arm K, which receives a force F introduced to the lever. By controlling the coil current $I_L$, a counterforce is generated on the coil L, which holds the lever arm nearly motionless in its set position. If force F is greater, a higher coil current $I_L$ is needed to generate the counterforce, while a lower force F requires a correspondingly lower coil current $I_L$ (the coil current can be unipolar or bipolar).

To measure the force F, the voltage $U_R$ produced across the measurement resistor R by coil current $I_L$ is tapped, amplified, and/or processed in an amplifier/filter $V_1$ and sent to a first A/D converter $AD_1$, which has a measurement range $M_1$. The A/D converter $AD_1$ outputs a digital value corresponding to the measurement resistor voltage $U_R$ to a control unit C as long as the measurement resistor voltage $U_R$ moves within the measurement range $M_1$. Since the measurement resistor voltage $U_R$ is a measurement of the force F, said force can be determined by evaluating the data sent to the control unit C.

At output A of the output stage E is an output stage voltage $U_E$, which in this embodiment corresponds to the auxiliary voltage $U_H$ registered according to the invention. The auxiliary voltage $U_H$ is again amplified and/or processed by an amplifier/filter $V_2$ and sent to a second A/D converter $AD_2$, whose measurement range $M_2$ is correspondingly greater than the measurement range $M_1$ of the first A/D converter $AD_1$ or joins it, so that a voltage lying outside the measurement range $M_1$ of the first A/D converter $AD_1$ lies within the measurement range $M_2$ of the second A/D converter $AD_2$. The signals output by the second A/D converter $AD_2$ are also sent to the control unit C for evaluation.

As long as the measurement resistor voltage $U_R$ moves within the measurement range $M_1$, a weight value corresponding to the force F can be determined in the control unit C from the signals provided by the A/D converter $AD_1$. If, on the other hand, the force F increases so much that the measurement resistor voltage $U_R$ lies outside the measurement range $M_1$, the force F can no longer be quantified with the A/D converter $AD_1$. However, the auxiliary voltage $U_H$ registered in addition to the measurement resistor voltage $U_R$, which likewise increases with increasing force F, can be registered and quantified via the second A/D converter $AD_2$ as long as the auxiliary voltage $U_H$ lies within the measurement range $M_2$ of the second A/D converter $AD_2$. With increasing force F, the auxiliary measurement voltage $U_H$ will then increase further until (a) the maximum output voltage (control) of the output stage E has been reached, so that it can no longer make available sufficient coil current $I_L$ to generate a sufficient counterforce in the coil L and to hold the lever K in the set position, or (b) a mechanical overload safety means T is actuated, so that the coil current $I_L$ is set to a constant value.

In both cases, overloading of the scale can already be established by the fact that the measurement resistor voltage $U_R$ leaves the measurement range of the A/D converter $AD_1$, or exceeds a threshold found just before that, or the A/D converter outputs a corresponding signal. In case (a), the force actuating the overload safety means can be determined only qualitatively, since the output stage E has reached its compensation load and the auxiliary voltage $U_H$ is no longer associated in a defined way with the force F or exceeds the measurement range $M_2$. In case (b), however, the fact that the overload safety means T has been actuated can be established from the timewise course of the auxiliary measurement voltage $U_H$ and the resulting maximum value of said voltage, and the actuating force can be determined quantitatively, since the auxiliary measurement voltage $U_H$ still lies within the measurement range $M_2$.

Figure 2:
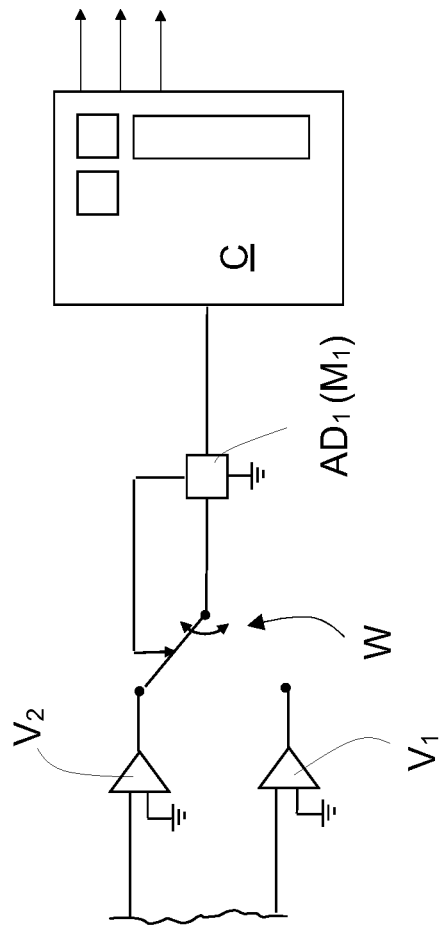
FIG. 2 shows an alternative embodiment for processing the measurement resistor voltage $U_R$ and auxiliary voltage $U_H$ with just one A/D converter.

FIG. 2 shows a solution according to the invention that has been modified with respect to FIG. 11, where the first A/D converter $AD_1$ is optionally used to register the measurement resistor voltage $U_R$ or the auxiliary voltage $U_H$. If the measurement resistor voltage $U_R$ sent to the A/D converter $AD_1$ exceeds the measurement range $M_1$ or a definable threshold just before that, the A/D converter $AD_1$ is switched (or it switches itself) in order to register the auxiliary voltage $U_H$ instead of the measurement resistor voltage $U_R$.

With the switching of the signal source at the input of the A/D converter $AD_1$, the measurement range of the converter can also be switched (preferably internally by the converter itself). For example, the sensitivity of the converter can be halved and thus the measurement range doubled. Alternatively, the amplification $V_2$ of the auxiliary measurement voltage could be reduced enough that the higher auxiliary measurement voltage also lies within the measurement range $M_1$.

The switch W causing the switching between the two voltages can be disposed outside or even on an A/D converter circuit board, so that its control can take place directly via the control of the A/D converter or, for example, even by the control unit C.

FIG. 3 shows an embodiment of the invention that has been modified with respect to FIG. 1. Unlike FIG. 1, the auxiliary measurement voltage here is not tapped between the output stage E and the coil L, but rather between coil L and the measurement resistor R (depending on the tapping point and the line resistance, it is also possible in this case for the auxiliary measurement voltage $U_H$ to differ from the measurement resistor voltage $U_R$). The A/D converter $AD_2$ can, as described with respect to FIG. 1, register the auxiliary measurement voltage again in a suitably amplified quantity and/or in a suitable measurement range $M_2$ and transmit it to the control unit for evaluation.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A scale which operates by the principle of electromagnetic force compensation, the scale including:
    (a) a magnet;
    (b) a compensation coil movable relative to the magnet;
    (c) an output stage having an output connected to the compensation coil to supply an electrical current to the compensation coil to maintain the position of the compensation coil relative to the magnet;
    (d) a measurement resistor connected in series with the compensation coil between the compensation coil and a reference voltage;
    (e) an auxiliary measurement voltage node located between the output of the output stage and the compensation coil or between the compensation coil and the measurement resistor to provide an auxiliary measurement voltage; and
    wherein a measurement resistor voltage across the measurement resistor is representative of a weight measurement value for the scale when a load force within a first load force range is introduced onto a load receiving element of the scale, and the auxiliary measurement voltage indicates an overload case when a load force outside the first load force range is introduced onto the load receiving element of the scale.

2. The scale of claim 1:
    (a) further including a first A/D converter and a signal switching arrangement operable to switch between a first input of the first A/D converter and a second input of the first A/D converter;
    (b) wherein the first input of the first A/D converter is coupled to the measurement resistor voltage; and
    (c) wherein the second input of the first A/D converter is coupled to the auxiliary measurement voltage.

3. The scale of claim 2 wherein the measurement resistor voltage receives a first amplification before the first input of the first A/D converter and the auxiliary measurement voltage receives a second amplification before the second input of the first A/D converter, the second amplification being less than the first amplification.

4. The scale of claim 2 wherein the first A/D converter provides a first measurement range for a signal received at the first input of the first A/D converter and provides a second measurement range for a signal received at the second input of the first A/D converter, the first measurement range being different from the second measurement range.

5. The scale of claim 1:
    (a) further including a first A/D converter and a second A/D converter;
    (b) wherein an input of the first A/D converter is coupled to the measurement resistor voltage; and
    (c) wherein an input of the second A/D converter is coupled to the auxiliary measurement voltage.

6. The scale of claim 5 wherein the measurement resistor voltage receives a first amplification before the input of the first A/D converter and the auxiliary measurement voltage receives a second amplification before the input of the second A/D converter, the second amplification being less than the first amplification.

7. The scale of claim 5 wherein the first A/D converter provides a first measurement range for a signal received at the input of the first A/D converter and the second A/D converter provides a second measurement range for a signal received at the input of the second A/D converter, the first measurement range being different from the second measurement range.

8. The scale of claim 1 further including a control unit operable to output an overload signal when one of the auxiliary measurement voltage and a signal generated from the auxiliary measurement voltage exceeds a presettable limit value.

9. The scale of claim 1 further including mechanical overload safety means and a control unit, wherein the control unit is operable to generate a signal corresponding to an actuating force of the mechanical overload safety means or a value derived therefrom by evaluating one of the auxiliary measurement voltage and a signal generated from the auxiliary measurement voltage.

10. The scale of claim 1 further including mechanical overload safety means and a control unit, wherein the control unit is also operable to detect an actuation of the mechanical overload safety means by comparison of one of the auxiliary measurement voltage and a signal generated from the auxiliary measurement voltage with one or more presettable threshold values or by analysis of a timewise course of one of the auxiliary measurement voltage and the signal generated from the auxiliary measurement voltage.

11. The scale of claim 1 further including a control unit operable for storing in memory (i) values for the measurement resistor voltage or a respective signal generated therefrom over time and (ii) values for the auxiliary measurement voltage or a respective signal generated therefrom over time.

12. The scale of claim 1 further including a control unit operable for detecting, evaluating, or outputting a time point or a number, kind, magnitude, and duration of instances of exceeding a presettable voltage limit value for the measurement resistor voltage or a respective signal generated therefrom or of instances of exceeding a presettable voltage limit value for the auxiliary measurement voltage or a respective signal generated therefrom.

13. A method for a scale which operates by the principle of electromagnetic force compensation and including a magnet, a compensation coil movable relative to the magnet, and an output stage having an output connected to the compensation coil to supply an electrical current to the compensation coil to maintain the position of the compensation coil relative to the magnet, the method including:
  (a) measuring a measurement resistor voltage across a measurement resistor connected between the compensation coil and a reference voltage, the measurement resistor voltage being representative of a weight measurement value for the scale when a load force within a first load force range is introduced onto a load receiving element of the scale; and
  (b) at least when the measurement resistor voltage or a signal generated therefrom exceeds a presettable voltage limit value therefor, measuring and evaluating an auxiliary measurement voltage tapped between the output of the output stage and the compensation coil or between the compensation coil and the measurement resistor, the auxiliary measurement voltage or a signal generated therefrom indicating an overload case when a load force outside the first load force range is introduced onto the load receiving element of the scale.

14. The method of claim 13 further including outputting an overload signal when the auxiliary measurement voltage or the signal generated therefrom exceeds one or more presettable limit values therefor.

15. The method of claim 13 further including outputting, or displaying, or storing the auxiliary measurement voltage or a value corresponding to the auxiliary measurement voltage, or a time point, a number, a kind, a magnitude, or a duration of instances in which the measurement resistor voltage or the signal generated therefrom exceeds the presettable voltage limit value therefor.

16. The method of claim 13 further including interrupting scale operation or preventing the output of a weight value for a presettable duration when the auxiliary measurement voltage or the signal generated therefrom exceeds a presettable voltage limit value therefor.

17. The method of claim 13 including zeroing or adjusting the scale in response to the auxiliary measurement voltage or the signal generated therefrom exceeding a presettable voltage limit value therefor.

18. A method for testing an overload safety device in a scale which operates by the principle of electromagnetic force compensation and including (i) a magnet, (ii) a compensation coil movable relative to the magnet, (iii) an output stage having an output connected to the compensation coil to supply an electrical current to the compensation coil to maintain the position of the compensation coil relative to the magnet when a load force within a first load force range is introduced onto a load receiving element of the scale, (iv) a measurement resistor connected in series with the compensation coil between the compensation coil and a reference voltage, and (v) a measurement resistor voltage output providing an output of a voltage across the measurement resistor, the method including:
  (a) evaluating an auxiliary measurement voltage tapped between the output of the output stage and the compensation coil or between the compensation coil and the measurement resistor to determine a value corresponding to an actuating force of the overload safety device; and
  (b) comparing the auxiliary measurement voltage or a signal generated therefrom to one or more presettable limit values in order to identify an occurrence of an actuation of the overload safety device.

* * * * *